United States Patent [19]

Dobson

[11] Patent Number: 5,514,644
[45] Date of Patent: May 7, 1996

[54] POLYSACCHARIDE CONTAINING FLUIDS HAVING ENHANCED THERMAL STABILITY

[75] Inventor: James W. Dobson, Houston, Tex.

[73] Assignee: Texas United Chemical Corporation, Houston, Tex.

[21] Appl. No.: 165,904

[22] Filed: Dec. 14, 1993

[51] Int. Cl.$^6$ .................................................. C09K 7/02
[52] U.S. Cl. .......................... 507/111; 507/113; 507/114
[58] Field of Search .................................. 507/111, 113, 507/114

[56] References Cited

U.S. PATENT DOCUMENTS

| | | | |
|---|---|---|---|
| 3,852,201 | 12/1974 | Jackson | 507/114 |
| 3,953,335 | 4/1976 | Jackson | 507/114 |
| 3,988,246 | 10/1976 | Hartfiel | 507/111 |
| 4,025,443 | 5/1977 | Jackson | 507/111 |
| 4,486,340 | 12/1984 | Glass, Jr. | 507/111 |
| 4,900,457 | 2/1990 | Clarke-Sturman | 507/111 |
| 5,407,475 | 4/1995 | Lukach et al. | 507/114 |

Primary Examiner—Philip Tucker
Attorney, Agent, or Firm—Roy F. House

[57] ABSTRACT

The invention provides (1) a method of increasing the thermal stability of an aqueous polysaccharide-containing fluid by adding thereto magnesia and a thiosulfate salt; (2) a drilling, completion, or workover fluid comprising an aqueous liquid, a water soluble polysaccharide, magnesia, and a thiosulfate salt; and (3) an additive for increasing the thermal stability of an aqueous polysaccharide-containing fluid which comprises magnesia and a thiosulfate salt in a weight ratio of magnesia to thiosulfate salt from about 0.15/1 to about 6.67/1. The preferred magnesia has an activity index less than 100, most preferably less than 50. The preferred thiosulfate salt is sodium thiosulfate. The preferred polysaccharide is selected from the group consisting of xanthan gum, epichlorohydrin crosslinked starch, carboxymethyl cellulose, and mixtures thereof. The preferred aqueous liquid is a saturated sodium chloride solution.

16 Claims, No Drawings

POLYSACCHARIDE CONTAINING FLUIDS HAVING ENHANCED THERMAL STABILITY

FIELD OF THE INVENTION

The invention pertains to aqueous fluids containing water soluble polysaccharides such as oil and gas well drilling fluids, completion fluids, workover fluids, and well servicing fluids.

BACKGROUND OF THE INVENTION

The use of fluids (and their compositions, characteristics, and functions) during the drilling of wells is well known. See for example the book "Composition and Properties of Oil Well Drilling Fluids," Fourth Edition, 1980, George R. Gray et al., Gulf Publishing Co., or Third Edition, 1963, Walter F. Rogers.

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores.

Many clay-free fluids have been proposed for contacting the producing zone of oil and gas wells. See for example the following U.S. patents: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine U.S. Pat. No. 4,186,803; Mondshine U.S. Pat. No. 4,369,843; Mondshine U.S. Pat. No. 4,620,596; and Dobson, Jr. et al. U.S. Pat. No. 4,822,500.

These fluids generally contain polymeric viscosifiers such as certain polysaccharides or polysaccharide derivatives, polymeric fluid loss control additives such as lignosulfonates, polysaccharides or polysaccharide derivatives, and bridging solids.

It is well known that the polysaccharides are degraded by heat and agitation. Thus starch breaks down rapidly at temperatures of 200° F. (93° C.) and above, guar gum breaks down rapidly at temperatures above 150° F. (65.5° C.). The thermal degradation of carboxymethyl cellulose is accelerated as temperature approaches 300° F. (150° C.). As the polysaccharides degrade, the properties of the fluids containing them degrade. Thus fluids containing polysaccharide viscosifiers decrease in viscosity, and fluids containing polysaccharide fluid loss reducing additives exhibit increased fluid loss.

Jackson U.S. Pat. No. 3,852,201 discloses the use of magnesium oxide (magnesia) to stabilize fluids containing hydroxyethyl cellulose to temperatures as high as 275° F. Jackson U.S. Pat. No. 3,953,335 discloses the use of magnesium oxide to increase the effectiveness of hydroxyalkyl cellulose over a higher temperature range and over a longer time period. Hartfield U.S. Pat. No. 3,988,246 discloses the use of magnesium oxide to stabilize fluids containing heteropolysaccharides such as xanthan gum. The wellbore fluids also included various starch derivatives as water loss reduction additives. Jackson U.S. Pat. No. 4,025,443 discloses the use of magnesium oxide to stabilize fluids containing hydroxyalkyl guar gum. Clarke-Sturman U.S. Pat. No. 4,900,457 discloses the use of a formate salt to enhance the thermal stability of aqueous polysaccharide solutions.

SUMMARY OF THE INVENTION

I have found that the thermal stability of fluids containing polysaccharides is enhanced by incorporating into the fluids magnesium oxide and a thiosulfate salt selected from the group consisting of sodium thiosulfate, ammonium thiosulfate, potassium thiosulfate, calcium thiosulfate, magnesium thiosulfate, ferrous thiosulfate, and mixtures thereof. The thiosulfate may be anhydrous or hydrated.

Thus it is an object of this invention to provide aqueous polysaccharide containing fluids having enhanced thermal stability. It is another object of this invention to provide a method of increasing the thermal stability of aqueous fluids containing one or more polysaccharides incorporated therein. Another object of this invention is to provide an additive for increasing the thermal stability of an aqueous polysaccharide-containing fluid selected from the group consisting of drilling fluids, completion fluids, workover fluids, and well servicing fluids, which comprises magnesium oxide and a thiosulfate salt, the thiosulfate salt preferably being selected from the group consisting of sodium thiosulfate, ammonium thiosulfate, potassium thiosulfate, calcium thiosulfate, magnesium thiosulfate, ferrous thiosulfate, and mixtures thereof. These and other objects of the invention will be readily apparent to one skilled in the art as the description thereof proceeds.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The fluids of the present invention contain an aqueous phase which may be either fresh water, a brine, sea water, or any combination thereof. The brine, if used, may be a naturally occurring brine or a manufactured brine obtained by the dissolution of one or more water soluble salts in water, a brine, sea water, or mixtures thereof. Suitable water soluble salts include sodium chloride, potassium chloride, calcium chloride, sodium acetate, potassium acetate, calcium acetate, sodium formate, potassium formate, sodium bromide, calcium bromide, zinc bromide, potassium bromide, and the like, and mixtures thereof.

The concentration of the water soluble salt in the brine may be any amount up to and including the amount required to form a saturated solution. Any salt present in the fluid in excess of the amount required to form a saturated solution is preferably present as a sized particulate to function as a bridging agent, such as disclosed in Mondshine U.S. Pat. Nos. 4,175,042 and 4,186,803, each incorporated herein by reference.

The water soluble polysaccharides useful in this invention may be any of the well known polysaccharides which are used to impart a desired property to the aqueous fluid, such as viscosity, gel strength, decreased water (fluid) loss, lubricity, shale swelling inhibition, and the like. Non-limiting examples of polysaccharides include starches, starch derivatives, modified starches, cellulose derivatives, naturally occurring gums, and derivatives thereof, biopolymers, and the like. Exemplary starch derivatives and modified starches include pregelatinized starches, crosslinked starches, dextrinized starches, oxidized starches, degraded starches, such as maltodextrins, starch ethers such as carboxymethyl starch, hydroxyethyl starch, hydroxypropyl starch, cationic starches, and the like, and starch esters such as starch acetate. Exemplary cellulose ethers include carboxymethyl cellulose, hydroxyethyl cellulose, hydroxypropyl cellulose, carboxymethyl hydroxyethyl cellulose, methyl cellulose, cationic celluloses, and the like. Exemplary gums and derivatives thereof include guar gum, hydroxypropyl guar, carboxymethyl hydroxypropyl guar, locust bean gum, ghatti gum, karaya gum, tamarind gum, carrageenan, alginates, and the like. Exemplary biopolymers (microbial polysaccharides) include xanthan gum (see U.S. Pat. No. 4,299,825), welan gum (see Kang et al. U.S. Pat. No. 4,342,866) and gellan gum (see Baird et al. U.S. Pat. No. 4,503,084).

The preferred water-soluble polysaccharides for use in the fluids of this invention are selected from the group consisting of carboxymethyl cellulose, hydroxyethyl cellulose, hydroxypropyl cellulose, methyl cellulose, carboxymethyl starch, hydroxyethyl starch, hydroxypropyl starch, epichlorohydrin crosslinked hydroxypropyl starch, xanthan gum, gellan gum, welan gum, and mixtures thereof; most preferably xanthan gum, epichlorohydrin crosslinked hydroxypropyl starch, carboxymethyl cellulose, and mixtures thereof.

The preferred fluids of this invention are clay-free fluids, such as the so-called low solids drilling fluids or non-dispersed muds. These fluids rely on polymers and soluble salts to inhibit swelling and dispersion, and on the use of mechanical separators to prevent the accumulation of drilled solids. Commonly used polymers are cellulose derivatives, starch derivatives, xanthan gum, and partially hydrolyzed polyacrylamide. See for example Miller et al. U.S. Pat. No. 3,878,110 and Walker U.S. Pat. No. 3,956,141.

The particularly preferred fluids of this invention are clay-free workover and completion fluids such as those disclosed in the following U.S. Patents, each incorporated herein by reference: Hartfield U.S. Pat. No. 3,988,246; Jackson et al, U.S. Pat. No. 3,993,570; Jackson et al. U.S. Pat. No. 4,003,838; Hunter et al. U.S. Pat. No. 4,012,328; Mondshine 4,175,042, Mondshine U.S. Pat. No. 4,186,803, Mondshine U.S. Pat. No. 4,620,596, and Dobson, Jr. et al, U.S. Pat. No. 4,822,500.

An essential component of the fluids of this invention is magnesium oxide (magnesia). As indicated hereinbefore, it is known that magnesium oxide enhances the thermal stability of fluids containing certain polysaccharides. The magnesium oxide is highly infusible, very slightly soluble, e.g., 0.0086 grams/100 cc of water at 30° C., and essentially non-hydratable. The concentration of magnesia in the fluids of this invention is preferably from about 1.5 ppb to about 10.0 ppb. Most preferably the concentration of magnesia is from about 1.5 ppb to about 7 ppb.

The preferred magnesia has an activity index less than about 100 seconds, most preferably less than 50 seconds.

The activity index of magnesia is obtained using the following test.

Principle

The rate at which magnesium oxide reacts with a dilute solution of acetic acid is used as a measure of activity. An excess of magnesia is used so that at the end point of the reaction, the solution goes from acidic to basic and is detected by a color change employing phenolphthalein indicator.

Apparatus and Reagents

Acetic acid solution 1.00±0.01N, standardized

Phenolphthalein soln. (1% solution in ethanol)

Waring blender, 2 speed with 32 oz. glass container

Balance with sensitivity of 0.01 gm

Stopwatch

Thermometer

Graduated cylinders, 100 ml and 500 ml

Procedure

1. Prior to the test, the water and the acetic acid solution should be brought to a temperature of 25±1° C.
2. Weigh a 5.00±0.02 grams aliquot of the magnesia sample.
3. Measure out 300 ml of water in a graduated cylinder and add it to the blender.
4. Carefully hold a thermometer in the blender and run blender until the temperature of the water is 28° C. Turn off the blender.
5. Add 5–10 drops of phenolphthalein indicator solution.
6. Add the magnesia sample and immediately start the blender on low speed.
7. Count ten seconds from the start of the blender and add 100 ml of the 1.00N acetic acid solution. The stopwatch is started as the acid is being added.
8. Stop the timer when the solution turns to a definite pink color. Record the reaction time in seconds as the activity index of the magnesia.
9. Note: Add three to five additional drops of indicator solution to the blender every 30 seconds until the color change has taken place.

The other essential component in the polysaccharide-containing fluids of this invention to enhance the thermal stability thereof is a thiosulfate salt selected from the group consisting of sodium thiosulfate, ammonium thiosulfate, potassium thiosulfate, calcium thiosulfate, magnesium thiosulfate, ferrous thiosulfate, and mixtures thereof. The thiosulfate is preferably sodium thiosulfate or ammonium thiosulfate because they are readily commercially available, most preferably sodium thiosulfate. The concentration of the thiosulfate salt in the fluids of this invention is preferably from about 1.5 ppb to about 10.0 ppb, most preferably from about 1.5 ppb to about 7 ppb.

The concentration of the magnesia and the concentration of the thiosulfate salt must be sufficient to increase the thermal stability of the polysaccharide(s)-containing fluid. An increase in the thermal stability of the fluid is observed when (1) the fluid can be used at a temperature in excess of the temperature which the fluid without both the magnesia and the thiosulfate salt can be used.; or (2) the fluid can be used for a longer period of time at an elevated temperature than the fluid without both the magnesia and the thiosulfate salt.

The aqueous polysaccharide-containing fluids, and the method of increasing the thermal stability of aqueous polysaccharide-containing fluids, of this invention are provided by incorporating into the aqueous polysaccharide-containing fluid from about 1.5 ppb to about 10 ppb of the magnesium oxide and from about 1.5 ppb to about 10 ppb of the thiosulfate salt. Alternatively and conveniently, the magnesia and the thiosulfate salt can be blended or mixed together to provide an additive for incorporation into the aqueous polysaccharide-containing fluid. The weight ratio of the magnesia to the thiosulfate salt is from about 10/1.5 to about 1.5/10, hence from about 6.67/1 to about 0.15/1. Preferably the weight ratio of the magnesia to the thiosulfate salt is from about 0.8/1 to about 5/1.

I have determined that sodium sulfite does not increase the thermal stability of aqueous polysaccharide-containing fluids in which only magnesia is present as a thermal stabilizing additive. However, the addition of sodium sulfite to aqueous polysaccharide-containing fluids in which both magnesia and a thiosulfate salt are present as thermal stabilizing agents further increases the thermal stability of the fluids. Thus it may be desirable, as evidenced by routine testing known to those skilled in the art, to add magnesia, a thiosulfate salt, and sodium sulfite or other oxygen scavengers, either singularly or blended together, to increase the thermal stability of polysaccharide-containing aqueous fluids.

In order to more completely describe the invention, the following non-limiting examples are given. In these examples and throughout this specification, the following abbreviations may be used: AI=activity index of the magnesia; STS=sodium thiosulfate; CMC=carboxymethyl cellulose; bbl=42 gallon barrel; ppb=pounds per 42 gallon barrel; ppg=pounds per gallon (U.S.); PV=plastic viscosity in centipoise; YP= yield point in pounds per 100 square feet; Gels=the 10 second/10 minute gel strengths in pounds per 100 square feet; LSV=Brookfield low shear viscosity at 0.3 revolutions per minute in centipoise; °F.=degrees Fahrenheit; °C.=degrees centigrade; oz=ounces; gm=grams; and ml=milliliters.

The plastic viscosity, yield point, gel strength, and pH data in the tables were obtained by the procedures set forth in the American Petroleum Institute's Recommended Practice 13B-1. The LSV was obtained for the fluids using a Brookfield Model LVTDVI viscometer having a number 2 spindle at 0.3 revolutions per minute. The LSV is indicative of the suspension properties of the fluid, the larger the LSV the better the suspension of solids in the fluid.

EXAMPLES

The fluids were prepared by mixing the thiosulfate salt or the magnesia/thiosulfate salt blend with the aqueous liquid, adding the remainder of the materials indicated in the tables, and mixing fifteen (15) minutes on a Hamilton beach mixer. Thereafter the fluids were evaluated for their initial properties, statically aged sixteen (16) hours at the temperature indicated in the tables, cooled to room temperature, and the fluids were reevaluated. The data are presented in Tables 1–5.

The data for 22 fluids are set forth in Tables 1–5. Note that fluids numbered 1, 2, 3, 13, 14, 15, 16, 19, 20, and 21 did not contain both magnesia and a thiosulfate salt and accordingly are not examples of the invention. These fluids were prepared and evaluated to indicate the enhanced thermal stability obtained by incorporating both magnesia and the thiosulfate salt into the polysaccharide-containing fluids.

The data in Table 1, Table 4, and Table 5 indicate that magnesia and the thiosulfate salt synergistically increased the thermal stability of the polysaccharides-containing aqueous fluid.

The data in Table 1 (Fluid No. 4) and Table 2 indicate that the concentration of the sodium thiosulfate should be in the range from about 1.5 ppb to about 10 ppb, preferably greater than 1.5 ppb and less than 10 ppb.

The data in Table 3 indicate that the thermal stability of fluids containing xanthan gum and epichlorohydrin crosslinked hydroxypropyl starch, which have enhanced thermal stability due to the presence of both magnesia and sodium thiosulfate therein, is further increased in the presence of the polysaccharide carboxymethyl cellulose.

TABLE 1

Completion Fluids Aged 16 Hours at 325° F.
Base Fluid:
1.25 ppb xanthan gum, 3.75 ppb epichlorohydrin crosslinked hydroxypropyl starch, 4.2 ppb carboxymethyl cellulose, and 66 ppb sized sodium chloride in 0.91 bbl of a 10.0 ppg sodium chloride brine (saturated salt (NaCl) water).

| Fluid No. | 1 | | 2 | | 3 | | 4 | |
|---|---|---|---|---|---|---|---|---|
| MgO, ppb/AI | 0 | | 0 | | 2.8/9 | | 2.8/9 | |
| STS[1], ppb | 0 | | 2.0 | | 0 | | 2.0 | |
| | Initial | Aged | Initial | Aged | Initial | Aged | Initial | Aged |
| PV | 45 | 2 | 43 | 5 | 53 | 20 | 50 | 30 |
| YP | 60 | 0 | 49 | 0 | 64 | 17 | 65 | 26 |
| Gels | 15/20 | 0/0 | 13/19 | 0/0 | 16/20 | 4/5 | 16/21 | 11/13 |
| pH | 8.2 | 3.45 | 8.15 | 3.9 | 9.9 | 8.6 | 10.0 | 9.1 |
| LSV | 43,600 | 0 | 41,500 | 0 | 46,500 | 3,000 | 48,500 | 9,800 |

[1]STS = Sodium Thiosulfate

TABLE 2

Completion Fluids Aged 16 Hours at 325° F.
Base Fluid:
1.25 ppb xanthan gum, 3.75 ppb epichlorohydrin crosslinked
hydroxypropyl starch, 4.2 ppb carboxymethyl cellulose, 66 ppb sized
sodium chloride, and 2.8 ppb MgO (AI = 9) in 0.91 bbl of a 10.0
ppg sodium chloride brine.

| Fluid No. | 5 | | 6 | | 7 | | 8 | |
|---|---|---|---|---|---|---|---|---|
| STS[1], ppb | 1.5 | | 2.5 | | 7.0 | | 10.0 | |
| | Initial | Aged | Initial | Aged | Initial | Aged | Initial | Aged |
| PV | 44 | 19 | 47 | 25 | 46 | 31 | 46 | 41 |
| YP | 57 | 11 | 66 | 23 | 69 | 26 | 67 | 22 |
| Gels | 15/19 | 2/3 | 16/20 | 10/11 | 16/20 | 11/13 | 16/18 | 5/6 |
| pH | 10.0 | 8.9 | 10.0 | 9.2 | 10.1 | 9.2 | 10.0 | 9.1 |
| LSV | 52,000 | 4,500 | 45,700 | 10,300 | 46,000 | 18,100 | 50,800 | 3,600 |

[1]STS = Sodium Thiosulfate

TABLE 3

Completion Fluids Aged 16 Hours at 325° F.
Base Fluid:
0.91 bbl of a 10.0 ppg sodium chloride brine, 1.25 ppb xanthan gum, 3.75
ppb epichlorohydrin crosslinked hydroxypropyl starch, and 66 ppb sized
sodium chloride.

| Fluid No. | 9 | | 10 | | 11 | | 12 | | 13 | | 14 | |
|---|---|---|---|---|---|---|---|---|---|---|---|---|
| CMC, ppb | 0 | | 0 | | 4.2 | | 4.2 | | 4.2 | | 4.2 | |
| STS, ppb | 2.0 | | 2.0 | | 2.0 | | 2.0 | | 0 | | 0 | |
| MgO, ppb/AI | 3.0/9 | | 7.0/9 | | 2.8/70 | | 2.8/18 | | 3/9 | | 7/9 | |
| | Initial | Aged | Initial | Aged | Initial | Aged | Initial | Aged | Initial | Aged | Initial | Aged |
| PV | 20 | 14 | 22 | 16 | 50 | 28 | 45 | 33 | 20 | 13 | 20 | 14 |
| YP | 30 | 17 | 32 | 18 | 60 | 25 | 70 | 27 | 30 | 2 | 30 | 12 |
| Gels | 12/15 | 4/9 | 13/16 | 9/9 | 15/20 | 10/12 | 16/21 | 12/14 | 12/16 | 2/1 | 12/16 | 4/6 |
| pH | 9.9 | 9.1 | 9.4 | 9.2 | 9.8 | 9.1 | 9.85 | 9.2 | 10.0 | 8.9 | 10.0 | 9.21 |
| LSV | 30,000 | 6,800 | 45,000 | 8,500 | 45,900 | 13,300 | 47,300 | 15,500 | 38,900 | 0 | 38,500 | 1,400 |

TABLE 4

Fluids Aged 16 Hours at 300° F.
Base Fluid:
0.96 bbl 3% KCl brine, 1.25 ppb xanthan gum, 3.75 ppb epichlorohydrin
crosslinked hydroxypropyl starch, 4.2 ppb carboxymethyl cellulose, and 35
ppb sized calcium carbonate.

| Fluid No. | 15 | | 16 | | 17 | | 18 | |
|---|---|---|---|---|---|---|---|---|
| MgO, ppb/AI | 2.8/9 | | 0 | | 2.8/9 | | 5.8/9 | |
| STS, ppb | 0 | | 2.0 | | 2.0 | | 2.0 | |
| | Initial | Aged | Initial | Aged | Initial | Aged | Initial | Aged |
| PV | 22 | 18 | 24 | 6 | 23 | 20 | 24 | 21 |
| YP | 37 | 26 | 38 | 1 | 38 | 30 | 39 | 33 |
| Gels | 11/15 | 5/6 | 11/15 | 0/0 | 11/15 | 8/9 | 11/15 | 10/11 |
| pH | 10.8 | 9.8 | 9.2 | 7.5 | 10.9 | 9.9 | 10.85 | 10.1 |
| LSV | 29,000 | 5,500 | 32,400 | 1,200 | 29,900 | 11,700 | 30,000 | 10,900 |

TABLE 5

Fluids Aged 16 Hours at 317° F.
Base Fluid:
1.25 ppb xanthan gum, 3.75 ppb epichlorohydrin crosslinked
hydroxypropyl starch, 4.2 ppb carboxymethyl cellulose, 66 ppb sized
sodium chloride in 0.91 bbl of a saturated NaCl brine.

| Fluid No. | 19 | | 20 | | 21 | | 22 | |
|---|---|---|---|---|---|---|---|---|
| MgO, ppb/AI | 0 | | 2.8/9 | | 0 | | 2.8/9 | |
| STS, ppb | 0 | | 0 | | 2.0 | | 2.0 | |
| | Initial | Aged | Initial | Aged | Initial | Aged | Initial | Aged |
| PV | 48 | 14 | 47 | 28 | 46 | 13 | 48 | 28 |
| YP | 55 | 16 | 62 | 20 | 59 | 19 | 61 | 24 |
| Gels | 15/19 | 5/6 | 15/20 | 8/9 | 15/19 | 9/10 | 16/20 | 9/11 |
| pH | 10.1 | 4.8 | 10.0 | 8.8 | 10.05 | 5.15 | 10.0 | 8.9 |
| LSV | 40,000 | 2,200 | 45,100 | 6,900 | 43,500 | 9,100 | 46,500 | 10,200 |

What is claimed is:

1. A method of increasing the thermal stability of a fluid comprising a saturated sodium chloride solution and at least one water soluble polysaccharide selected from the group consisting of starch derivatives, biopolymers, and mixtures thereof, dispersed therein which comprises adding to the fluid magnesia and a thiosulfate salt selected from the group consisting of sodium thiosulfate, ammonium thiosulfate, potassium thiosulfate, calcium thiosulfate, magnesium thiosulfate, ferrous thiosulfate, and mixtures thereof, the concentration of the magnesia and the thiosulfate salt being sufficient to synergistically increase the thermal stability of the fluid.

2. The method of claim 1 wherein the magnesia has an activity index less than 100 and wherein the thiosulfate salt is sodium thiosulfate.

3. The method of claim 1 wherein the polysaccharide is selected from the group consisting of carboxymethyl starch, hydroxyethyl starch, hydroxypropyl starch, epichlorohydrin crosslinked hydroxypropyl starch, xanthan gum, gellan gum, welan gum, and mixtures thereof.

4. The method of claim 3 wherein the magnesia has an activity index less than 100 and wherein the thiosulfate salt is sodium thiosulfate.

5. The method of claim 1 wherein the polysaccharide is selected from the group consisting of xanthan gum, epichlorohydrin crosslinked hydroxypropyl starch, and mixtures thereof, wherein the magnesia has an activity index less than 50 and wherein the thiosulfate salt is sodium thiosulfate.

6. The method of claim 1, 2, 3, 4 or 5 wherein the concentration of magnesia is from about 1.5 to about 10 pounds per 42 gallon barrel of fluid and wherein the concentration of thiosulfate salt is from about 1.5 to about 10 pounds per 42 gallon barrel of fluid.

7. An aqueous fluid selected from the group consisting of drilling fluids, completion fluids, and workover fluids which comprises, a saturated sodium chloride solution, a water soluble polysaccharide selected from the group consisting of starch derivatives, biopolymers, and mixtures thereof, magnesia and a thiosulfate salt, wherein the concentration of both the magnesia and thiosulfate salt are from about 1.5 to about 10 pounds per 42 gallon barrel.

8. The fluid of claim 7 wherein the thiosulfate salt is selected from the group consisting of sodium thiosulfate, ammonium thiosulfate, potassium thiosulfate, calcium thiosulfate, magnesium thiosulfate, and mixtures thereof, and wherein the magnesia has an activity index less than 50.

9. The fluid of claim 8 wherein the polysaccharide is selected from the group consisting of carboxymethyl starch, hydroxyethyl starch, hydroxypropyl starch, epichlorohydrin crosslinked hydroxypropyl starch, xanthan gum, gellan gum, welan gum, and mixtures thereof.

10. The fluid of claim 8 wherein the thiosulfate salt is sodium thiosulfate, and wherein the polysaccharide is selected from the group consisting of xanthan gum, epichlorohydrin crosslinked hydroxypropyl starch, and mixtures thereof.

11. An additive for increasing the thermal stability of an aqueous fluid comprising a saturated sodium chloride solution and a water soluble polysaccharide selected from the group consisting of starch derivatives, biopolymers, and mixtures thereof, which comprises magnesia and a thiosulfate salt selected from the group consisting of sodium thiosulfate, ammonium thiosulfate, potassium thiosulfate, calcium thiosulfate, magnesium thiosulfate, ferrous thiosulfate, and mixtures thereof, wherein the weight ratio of magnesia to thiosulfate salt is from about 0.8/1 to about 6.67/1.

12. The additive of claim 11 wherein the magnesia has an activity index less than 50 and wherein the thiosulfate salt is sodium thiosulfate.

13. The additive of claim 12 wherein the weight ratio of magnesia to sodium thiosulfate is from about 0.8/1 to about 5/1.

14. The additive of claim 11 wherein the weight ratio of magnesia to the thiosulfate salt is from about 0.8/1 to about 5/1.

15. The fluid of claim 7 which additionally contains carboxymethylcellulose.

16. The method of claim 1 wherein the fluid additionally contains carboxymethylcellulose.

* * * * *